United States Patent
Owen (10) Patent No.: US 9,623,985 B2
(45) Date of Patent: Apr. 18, 2017

(54) STRUT MOUNT

(71) Applicant: Richard Earl Owen, Sterline, VA (US)

(72) Inventor: Richard Earl Owen, Sterling, VA (US)

(73) Assignee: ADI Technologies, Inc., Mclean, VA (US)

( * ) Notice: Subject to any disclaimer, the term of this patent is extended or adjusted under 35 U.S.C. 154(b) by 541 days.

(21) Appl. No.: 13/942,358

(22) Filed: Jul. 15, 2013

(65) Prior Publication Data

US 2015/0014503 A1    Jan. 15, 2015

(51) Int. Cl.

| | | |
|---|---|---|
| *F16M 13/00* | (2006.01) | |
| *B64D 47/08* | (2006.01) | |
| *G03B 15/00* | (2006.01) | |
| *A47B 96/06* | (2006.01) | |
| *E04G 3/00* | (2006.01) | |
| *F16B 1/00* | (2006.01) | |
| *G09F 7/18* | (2006.01) | |
| *A47H 1/10* | (2006.01) | |
| *B42F 13/00* | (2006.01) | |
| *G03B 39/00* | (2006.01) | |
| *G03B 17/00* | (2006.01) | |

(Continued)

(52) U.S. Cl.
CPC ........... *B64D 47/08* (2013.01); *G03B 15/006* (2013.01); *F16B 2/10* (2013.01); *F16F 7/00* (2013.01); *F16F 9/00* (2013.01); *F16F 9/003* (2013.01); *F16F 15/12366* (2013.01); *F16F 15/1435* (2013.01); *F16F 15/1442* (2013.01); *F16L 3/1075* (2013.01); *Y10T 29/4984* (2015.01); *Y10T 29/49826* (2015.01); *Y10T 29/49863* (2015.01)

(58) Field of Classification Search
CPC  G03B 15/006; F16B 2/10; B62J 11/00; F16L 3/1075; F16F 7/00; F16F 9/00; F16F 9/003; F16F 15/12366; F16F 15/12373; F16F 15/1435; F16F 15/1442
USPC ... 248/229.13, 229.23, 228.4, 230.4, 231.51, 248/316.1, 317, 339, 340, 602, 606, 610; 396/7, 12, 55, 419, 427; 348/143, 144, 348/148
See application file for complete search history.

(56) References Cited

U.S. PATENT DOCUMENTS

| | | | | |
|---|---|---|---|---|
| 4,445,657 A | * | 5/1984 | Breckenridge | ................. 248/73 |
| 4,752,791 A | * | 6/1988 | Allred | ............................ 396/13 |

(Continued)

OTHER PUBLICATIONS

Author Unknown, "Aircraft Camera Pod", Tech Briefs, Apr. 1, 2013, 1 page, http://www.techbriefs.com/component/content/article/16210, accessed Jul. 12, 2013.

(Continued)

*Primary Examiner* — Brian Mattei
*Assistant Examiner* — Taylor Morris
(74) *Attorney, Agent, or Firm* — MH2 Technology Law Group, LLP (57) ABSTRACT

Apparatus and method for mounting an object are provided. The apparatus includes a clamp configured to attach to a strut, and a bracket coupled to the clamp. The bracket includes a first arm having a first end disposed proximal to the clamp and a second end disposed distal to the clamp, and a second arm having a first end disposed proximal to the clamp and coupled to the object, and a second end coupled to the second end of the first arm. The second arm is positioned between the first arm and the object.

8 Claims, 4 Drawing Sheets

(51) Int. Cl.
*H04N 7/18* (2006.01)
*F16F 15/14* (2006.01)
*F16B 2/10* (2006.01)
*F16L 3/10* (2006.01)
*F16F 9/00* (2006.01)
*F16F 7/00* (2006.01)
*F16F 15/123* (2006.01)

(56) References Cited

U.S. PATENT DOCUMENTS

| | | | |
|---|---|---|---|
| 4,825,232 A * | 4/1989 | Howdle | 396/12 |
| 5,335,893 A * | 8/1994 | Opp | B64C 1/066 |
| | | | 248/632 |
| 5,426,476 A | 6/1995 | Fussell et al. | |
| 5,897,223 A | 4/1999 | Tritchew et al. | |
| 6,484,978 B2 * | 11/2002 | Voigt et al. | 248/182.1 |
| 6,542,181 B1 | 4/2003 | Houska et al. | |
| 6,568,644 B2 * | 5/2003 | Pedersen | 248/229.13 |
| 7,364,128 B2 * | 4/2008 | Donaldson et al. | 248/292.12 |
| 7,670,066 B2 * | 3/2010 | Araki | 396/428 |
| 8,346,070 B2 | 1/2013 | Beasley | |
| 8,385,065 B2 | 2/2013 | Weaver et al. | |
| 8,485,740 B1 * | 7/2013 | Chapman | 396/428 |
| 2004/0155959 A1 | 8/2004 | Cullens | |
| 2009/0148150 A1 * | 6/2009 | Valles Navarro et al. | 396/428 |
| 2010/0079101 A1 * | 4/2010 | Sidman | F16M 11/041 |
| | | | 318/649 |
| 2011/0142284 A1 * | 6/2011 | Shepherd et al. | 382/103 |

OTHER PUBLICATIONS

Author Unknown, Development, AP Pod, The Aerial Photo Pod Company, pp. 1-3, http://www.theaerialphotopodcompany.com/development.html, accessed Jul. 12, 2013.
Author Unknown, "The Digital Solution for Today's Environment", SkyIMD, pp. 1-3, http://www.skyimd.com/systemoverview.html, accessed Jul. 12, 2013.
Author Unknown, Aircraft Strut Mounts for GoPro Hero, Aero Video, pp. 1-2, http://www.aerovideo.net/, accessed Jul. 12, 2013.
Author Unknown, Moving Aerial Camera Wing Mount System for Cessna Aircraft, Last Refuge Ltd., pp. 1-3, http://www.lastrefuge.co.uk/data/aerials/aviation_mount.html, accessed Jul. 12, 2013.
Author Unknown, The Enforcer, your eye from the Sky, Cessna, A Textron Company, pp. 1-2, http://textron.vo.lInwd.net/o25/CES/cessna_aircraft_docs/promotion/Enforcer_Program.pdf, accessed Jul. 12, 2013.

* cited by examiner

STRUT MOUNT

FIELD OF THE DISCLOSURE

The present disclosure relates generally, without limitation, to payload mounts, such as camera mounts, for aircraft.

BACKGROUND

It can be advantageous to secure a device to the exterior of an aircraft. For example, aerial photography and surveillance may call for a camera to be mounted to the exterior of the aircraft. In other situations, other exterior-mounted objects, such as signal receivers (antenna, radio or satellite receivers, etc.), radar (such as synthetic aperture radar (SAR)), sensors, or other devices, may be mounted to the exterior of the aircraft.

In many cases, general purpose aviation aircraft, especially fixed wing aircraft, are not manufactured with such exterior-mounted objects integrated therewith. Accordingly, the exterior-mounted objects may be attached to the exterior of the aircraft. Such attaching, however, often requires modification to the aircraft, such as drilling holes or otherwise modifying the structure of the aircraft. These modifications may trigger requirements that the modified aircraft be determined (e.g., via inspection) to be in compliance with regulations promulgated by the Federal Aviation Administration, state or local rulemaking authorities, or other federal authorities.

SUMMARY

Embodiments of the disclosure may provide an apparatus for mounting an object. The apparatus includes a clamp configured to attach to a strut, and a bracket coupled to the clamp. The bracket includes a first arm having a first end disposed proximal to the clamp and a second end disposed distal to the clamp, and a second arm having a first end disposed proximal to the clamp and coupled to the object, and a second end coupled to the second end of the first arm. The second arm is positioned between the first arm and the object.

Embodiments of the disclosure may also provide a method for mounting an object. The method includes selecting an insert from a plurality of inserts based on a dimension of a strut to which the object is to be mounted. The method also includes coupling a bracket to the strut using the insert, and suspending the object from the bracket, such that vibration from the strut is substantially isolated from the object in at least one axis.

Embodiments of the disclosure further provide a mount for mounting a payload object to a strut of an aircraft. The mount includes a hinged clamp secured to the strut without substantially modifying the strut, and a bracket. The bracket includes a first plate coupled with the clamp, and first arms that each include a first end coupled with the first plate and a second end. The bracket also includes dampers that are each coupled to one of the first arms at the second end thereof, and second arms that each include a first end and a second end. The second end of each of the second arms is coupled with one of the dampers. Further, the second arms are positioned between the payload object and the first arms, wherein at least a portion of the second arms extend substantially parallel to at least a portion of the first arms. The bracket also includes a second plate aligned with the first plate, the second plate being coupled with the first end of each of the second arms. The payload object is secured to the first plate.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings. In the figures.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawing that forms a part thereof, and in which is shown by way of illustration a specific exemplary embodiment in which the present teachings may be practiced. The following description is, therefore, merely exemplary.

Figure 1:
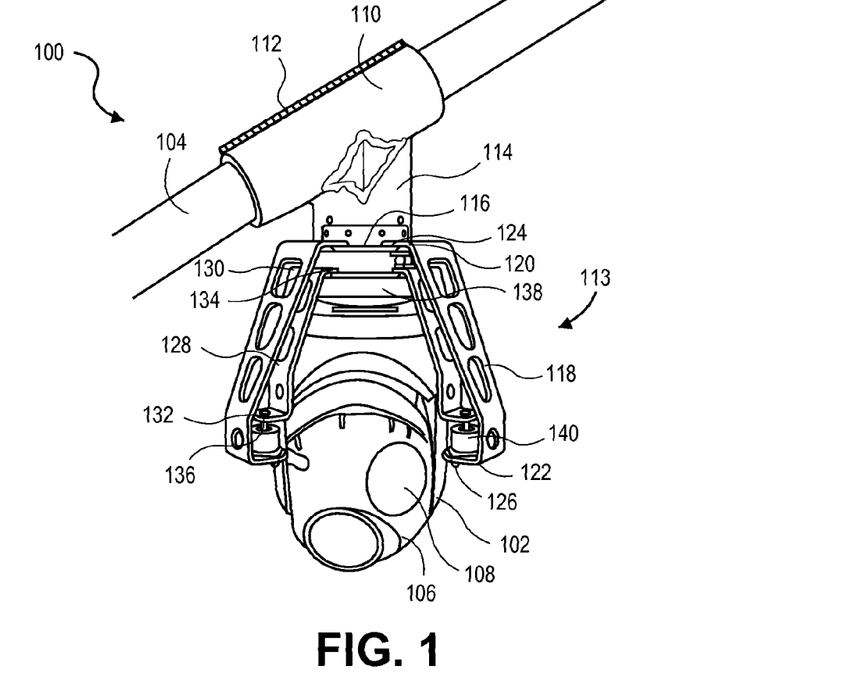
FIG. 1 illustrates a perspective view of a mount for attaching an object to an aircraft, according to an embodiment.

FIG. 1 illustrates a perspective view of a mount 100 for attaching an object 102 to a strut 104, for example, a wing strut of an aircraft. Although the mount 100 is described in the aviation context, it will be appreciated that this is but one example of an intended use for the mount 100, among many uses contemplated herein. Thus, it will be appreciated that the mount 100 may be configured for use with any vehicle, structure, etc. to which an object may be secured. Furthermore, in an embodiment, the object 102 may be a camera, as shown. The camera 102 may include a domed assembly 106 that may include one or more lenses 108, and internal electromechanical components configured to position (e.g., rotate) the domed assembly 106 and/or the lens 108 with respect to the strut 104. However, it will be appreciated that a camera is but one example among many contemplated for the object 102; indeed, the object 102 may be any type of object or "payload."

The mount 100 may include a clamp 110 configured to securely couple with the strut 104, for example, to suspend the remainder of the mount 100 and/or object 102 therefrom. The clamp 110 may include a hinge 112, and thus, in some cases, may be referred to as being "hinged." In other embodiments, the clamp 110 may not be hinged, and may instead include a removable segment, for example. The clamp 110 may be configured to secure to the strut 104 without requiring modification to the strut 104. Accordingly, in a hinged embodiment, the clamp 110 may be configured to receive the strut 104 and be secured therearound without requiring a free end of the strut 104 for the clamp 110 to slide over. The clamp 110 will be described in greater detail below. Further, in the context of the present disclosure, "without substantial modification" may allow for one or more holes, for example, to run wires through the strut 104, to be drilled.

The mount 100 may also include a bracket 113, which may include a base 114 extending from the clamp 110 and a first plate 116 coupled to the base 114, opposite from the clamp 110. In an embodiment, the base 114 may be generally tubular and may be welded, fastened, or otherwise attached to the clamp 110. The first plate 116 may be generally disk-shaped and may be coupled to the base 114 via welding, fasteners, or the like. In other embodiments, the first plate 116 may have any other shape.

The bracket 113 may also include first arms 118, which may be coupled with the first plate 116 and may extend therefrom. In various embodiments, two, three, four, or more first arms 118 may be included, for example, depending on the design considerations for suspending the objection 102. Each of the first arms 118 may include a first end 120 that is coupled with the first plate 116 and a second end 122 that is disposed opposite or "distal" to the first end 120. Each of the first arms 118 may also include horizontally-extending connection sections 124, 126 proximal to the first and second ends 120, 122, respectively. The first arms 118 may couple with the first plate 116 via the connection sections 124, for example, by welding, fastening, etc. Further, the each of the first arms 118 may extend at an obtuse angle with respect to the connections section 124 thereof, such that the circumferential distance between adjacent ones of the first arms 118 increases as proceeding from the first end 120 to the second end 122.

The bracket 113 may also include second arms 128, which may be positioned between the first arms 118 and the object 102. The second arms 128 may include a first end 130 and a second end 132 and horizontally-extending connection sections 134, 136 coupled thereto, respectively. The second arms 128 may extend between the connection sections 134, 136 at an obtuse angle with respect thereto, such that a circumferential distance between adjacent ones of the second arms 128 increases as proceeding from the first end 130 toward the second end 132. In an embodiment, the first and second arms 118, 128 may be substantially parallel to one another, for example, between the connection sections 124, 126 and 134, 136 thereof, respectively.

The first and second arms 118, 128 may be constructed from any suitable material, such as, for example, a metal such as steel or aluminum. In other embodiments, the first and second arms 118, 128 may be constructed from a polymeric material, or any other suitable material.

The bracket 113 may also include a second plate 138, which may be connected to the connection sections 134 at the first ends 130 of the second arms 128. The second plate 138 may be configured to couple with the object 102, which may include, e.g., a camera mount. Accordingly, the second plate 138 may include any apertures, bolts, screws, other fasteners, etc. to facilitate coupling with the object 102. Furthermore, the second plate 138 may be aligned with the first plate 116, for example, may be disposed generally concentric therewith.

The bracket 113 may also include a plurality of dampers 140 disposed between the first and second arms 118, 128. Further, the first and second arms 118, 128, coupled via the dampers 140, may provide the sole connection between the first and second plates 116, 138. In an embodiment, the dampers 140 may be coupled to the connection sections 126, 136 at the second ends 122, 132 of the first and second arms 118, 128. The dampers 140 may be dashpot-type dampers, configured to damp vibration in at least one axis. In the illustrated embodiment, the dampers 140 may be configured to damp vibration, and thereby reduce the amplitude thereof, from the first arms 118 to the second arms 128, and vice versa. Further, by extending between the horizontally-extending connection sections 126, 136, the dampers 140 may be configured to damp vibration in the vertical direction. With multiple first and second arms 118, 128, such vertical vibration damping may result in damping not only vertical movement of the object relative to a stationary reference frame, but also canting movement of the object 102 with respect to the stationary reference frame. Thus, by providing such damping via the dampers 140, the bracket 113 may substantially isolate the object 102 from vibration in the strut 104 in at least one axis from the strut 104.

Further, in at least one embodiment, the bracket 113 may be generally immobile relative to the strut 104, for example, by securely fastening the clamp 110 to the bracket 113 and the strut 104. However, while the bracket 113 itself may be restrained from, e.g., rotational movement with respect to the strut 104, the object 102 may rotate with respect to the strut 104 (and thus with respect to the bracket 113), for example, in response to commands received from a user.

Figure 2:
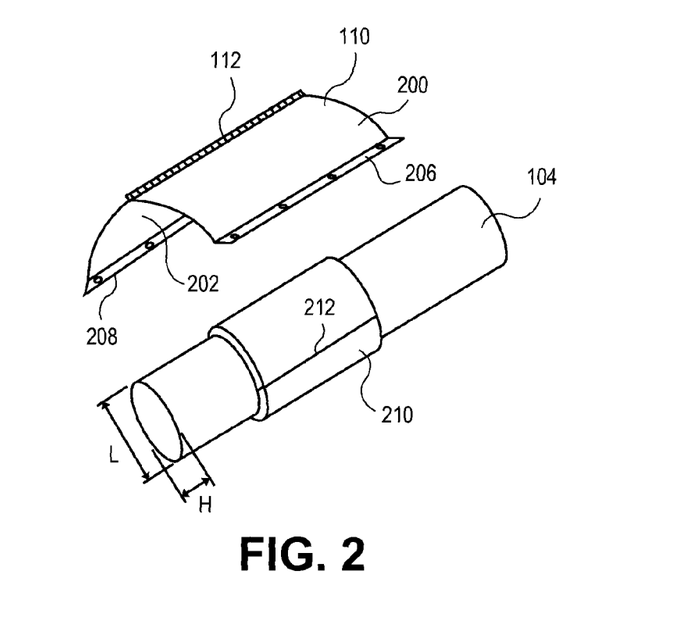
FIG. 2 illustrates a perspective view of a hinged clamp and insert for securing the mount to a strut of the aircraft, according to an embodiment.

FIG. 2 illustrates a perspective view of the clamp 110 being secured to strut 104, according to an embodiment. As shown, the clamp 110 may include a plurality of arcuate portions 200, 202, which may be connected together via the hinge 112. The base 114 (FIG. 1) may be coupled, e.g., welded, to one of the arcuate portions 200, 202.

In some embodiments, the arcuate portions 200, 202 may be approximately equal in size; however, in other embodiments, one of the arcuate portions 200, 202 may be larger than the other. Although two arcuate portions 200, 202 are shown, it will be appreciated that additional arcuate portions, whether fixed together, pivotal relative to one another, etc. may be included without departing from the scope of the present disclosure.

The arcuate portions 200, 202 may include flanges 206, 208, for example, opposite their connection with the hinge 112. The flanges 206, 208 may come together to close the clamp 110, and may be fastened or welded (or otherwise coupled) together. The arcuate portions 200, 202 may thus angularly expand, by pivoting one relative to the other, so as to receive the strut 104. Moreover, the arcuate portions 200, 202 may each define a shape that is generally elongated, such as an ellipsis or airfoil shaped, or otherwise shaped to an expected or predetermined shape of the strut 104.

However, among different models of aircraft, the strut 104 may have different dimensions. Such dimensions may include a length L and a height H (or diameter, or major and minor diameter, depending on the type of cross-sectional shape of the strut 104; all of these are within the scope of the term "dimension" of the strut 104). The clamp 110 may, however, be sized to accommodate the largest expected dimensions L, H, and thus, in some cases, may be larger than the strut 104. To, for example, avoid a gap or loose connection between the strut 104 and the clamp 110, the mount 100 may include an insert 210, which is sized to snugly fit around the strut 104, for example, via a seam 212. The illustrated location of the seam 212 is merely an example, and the seam 212 can be positioned anywhere on the insert 210.

Further, the insert 210 may be selected from a plurality of inserts, which may have varying inner dimensions so as to accommodate a variety of strut 104 dimensions L, H. The exterior dimensions of the inserts 210 may, however, remain generally constant, so as to adapt the various strut 104 sizes to the size of the clamp 110. In some embodiments, the width (i.e., parallel to the longitudinal axis of the strut 104) may be smaller than that of the clamp 110; however, in other embodiments, it may be the same or longer in width to the clamp 110.

In some embodiments, the insert 210 may provide more than a dimension change from the strut 104 to the clamp 110. In such cases, the inner shape of the insert 210 may have one shape, and the external shape of the insert 210 may have a different shape. Thus, if the strut 104 were, for example, cylindrical, the insert 210 may adapt the mount 100 such that the airfoil-shaped clamp 110 may fix to the strut 104. The inserts 210 may be manufactured from a flexible material, such as a rubber, elastomer, polymer, and/or the like, and in some cases, may be made from a relatively inexpensive material, such that the provision of multiple inserts 210 may be more cost effective than custom-making the clamp 110.

In some cases, more than one insert 210 may be employed for a given strut 104. For example, the inserts 210 may be configured to stack onto one another so as to bridge a gap between the strut 104 and the clamp 110 that is equivalent to the combination of the thicknesses of the inserts 210. Further, in some instances, the clamp 110 may have internal shoulders, ridges, etc., and the insert(s) 210 may provide a complementary surface, or a friction-increasing surface, so as to promote positional fixing of the clamp 110 on the strut 104.

Figure 3:
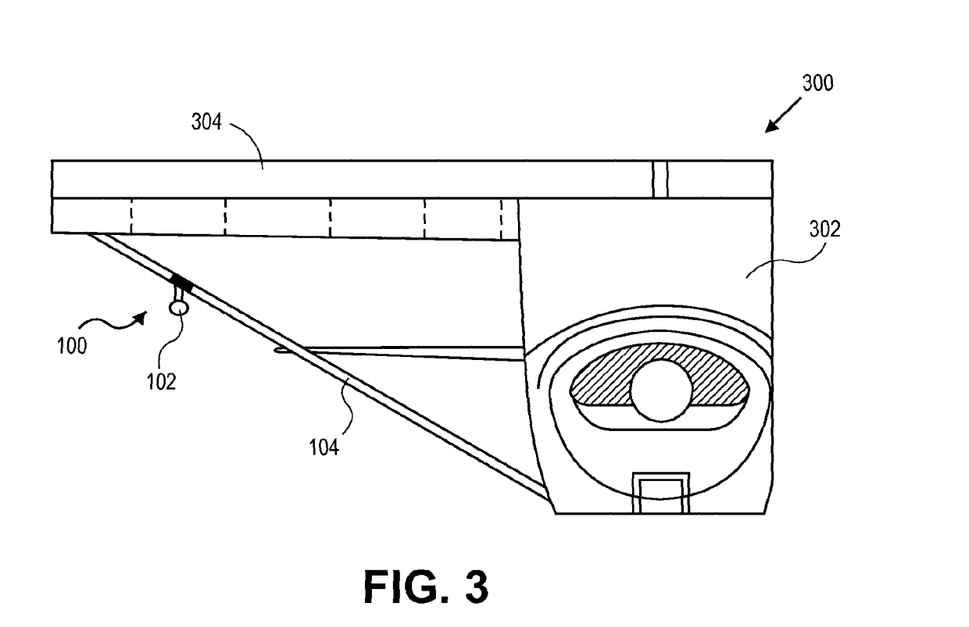
FIG. 3 illustrates a view of an aircraft including the strut and the mount, according to an embodiment.

FIG. 3 illustrates a view of an aircraft 300 including the wing strut 104 to which the mount 100 is attached, according to an embodiment. The wing strut 104 may extend between a fuselage 302 of the aircraft 300 and a point along a wing 304 thereof. However, it will be appreciated that the strut 104 may be another strut of the aircraft 300, and that the aircraft 300 need not be a fixed-wing airplane, but may be any suitable type of aircraft, another vehicle, or structure. Further, the mount 100, and object 102 it carries, may be mounted on any location along the strut 104.

The object 102, such as a camera, may be configured to send data signals to a device (e.g., instrument panel, laptop computer, tablet, handheld device, etc.), which may be located in the fuselage 302. The data may be sent via one or more wires, which may run outside of or through the strut 104 to the fuselage 302, either via the wing 304 or directly through the strut 104. In another embodiment, a wireless connection may be employed to transmit such data. Further, the object 102 may be battery powered or may receive power via one or more wires disposed in the strut 104.

Figure 4:
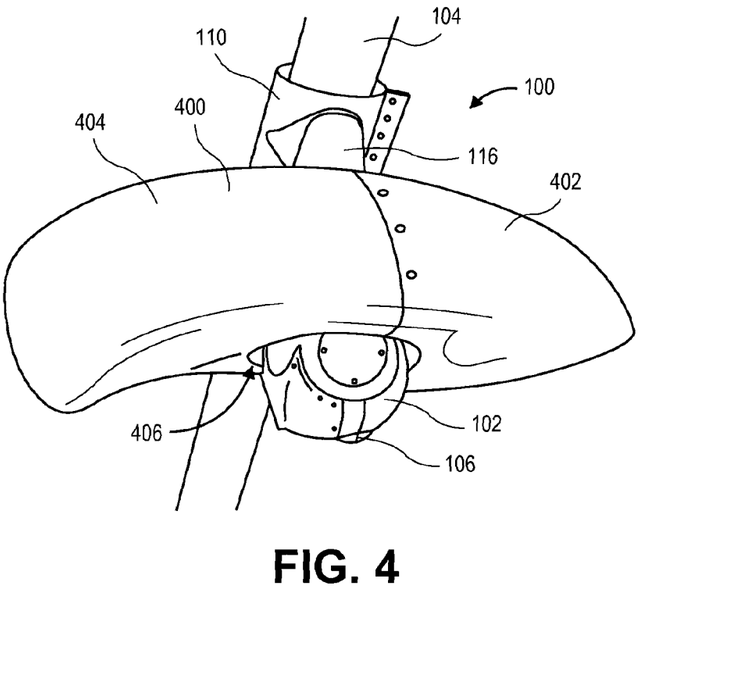
FIG. 4 illustrates the mount with an aerodynamic cover or "fairing" coupled thereto, according to an embodiment.

FIG. 4 illustrates a lowered, side perspective view of the mount 100, with an aerodynamic cover or "fairing" 400 coupled thereto, according to an embodiment. The fairing 400 may be elongated and smoothly curved, so as to minimize drag. Furthermore, the fairing 400 may be split into two or more sections (two shown: 402, 404) so as to facilitate placement of the fairing 400 about the mount 100 and/or object 102. The fairing 400 may cover the bracket 113, for example, the first and second arms 118, 128, so as to, for example, protect the components of the bracket 113 and at least a portion of the object 102, while also reducing drag that might otherwise be associated therewith.

Additionally, the fairing 400 may define an opening 406, for example, in a bottom thereof, i.e., opposite to the strut 104. For example, if the object 102 is a camera, the opening 406 may provide a location through which the lens 108 (FIG. 1) can view the ground below the aircraft 300 (FIG. 3). In some instances, the domed assembly 106 of such a camera embodiment of the object 102 may be sufficiently rugged and aerodynamic so as to extend outside of the fairing 400; however, in other embodiments, the fairing may provide additional protection for the object 102.

The fairing 400 may be formed from any suitably rigid material such as, for example, a metal like aluminum. In some cases, a polymeric and/or carbon-fiber fairing 400 may be suitable. Further, it will be appreciated that various materials may be employed to form the fairing 400, for use in various contexts. Moreover, in some cases, the fairing 400 may not be needed, and may thus be omitted.

Figure 5:
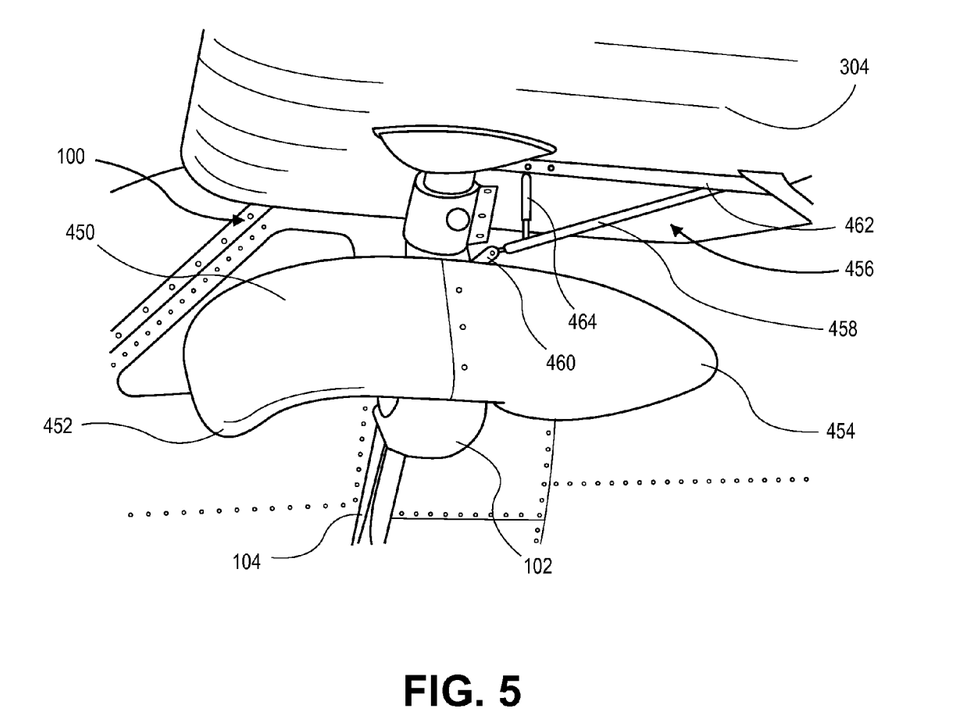
FIG. 5 illustrates the mount with another embodiment of the fairing.

FIG. 5 illustrates another embodiment of the mount 100, which may employ a differently shaped fairing 450 as compared to the fairing 400. As shown, the fairing 450 may include a nose 452 and a tail 454. The nose 452 may extend lower than the tail 454, and may serve to decrease drag and protect the bracket 113 (e.g., FIG. 1) and at least a portion of the object 102.

Further, the mount 100 may include a support truss 456. In an embodiment, the support truss 456 may include an arm 458 which may be coupled at one end to the fairing 450, for example, via a tab 460 of the fairing 450. In another embodiment, the arm 458 may additionally or instead connect directly to the bracket 113 (FIG. 1). Further, the arm 458 may extend diagonally, upward and, for example, rearward, to the wing 304. The support truss 456 may also include a second support arm 462, which may extend substantially vertically from the wing 304 and connect with the arm 458, the tab 460, or both. The support truss 456 may further include a base 464 that may be connected with the wing 304. In an embodiment, the base 464 may span and be connect to (e.g., be fastened to) two or more internal spars that support the wing 304 structure. In some embodiments, the support arm 458 may be directly coupled to the spar(s) of the wing 304 and the beam 458 may thus be omitted.

The support truss 456 coupled with the wing 304 may serve to provide increased stability to the mount 100, for example, providing an additional connection to the wing 304, so as to resist torque generated by the inertia of the mount 100 and object 102 and/or by drag forces incident on the fairing 450. It will be appreciated that the support 456 may be employed with any embodiment of the mount 100 (including either fairing 400 or 450).

With continuing reference to FIGS. 1-4, FIG. 6 illustrates a flowchart of a method 500 of mounting the object 102 to an exterior of an aircraft, for example, to the wing strut 104 of the aircraft 300, according to an embodiment. The method 500 may proceed by operation of one or more embodiments of the mount 100 described above, and may thus be best understood with reference thereto; however, it will be appreciated that the method 500 is not limited to any particular structure unless otherwise expressly stated herein.

Figure 6:
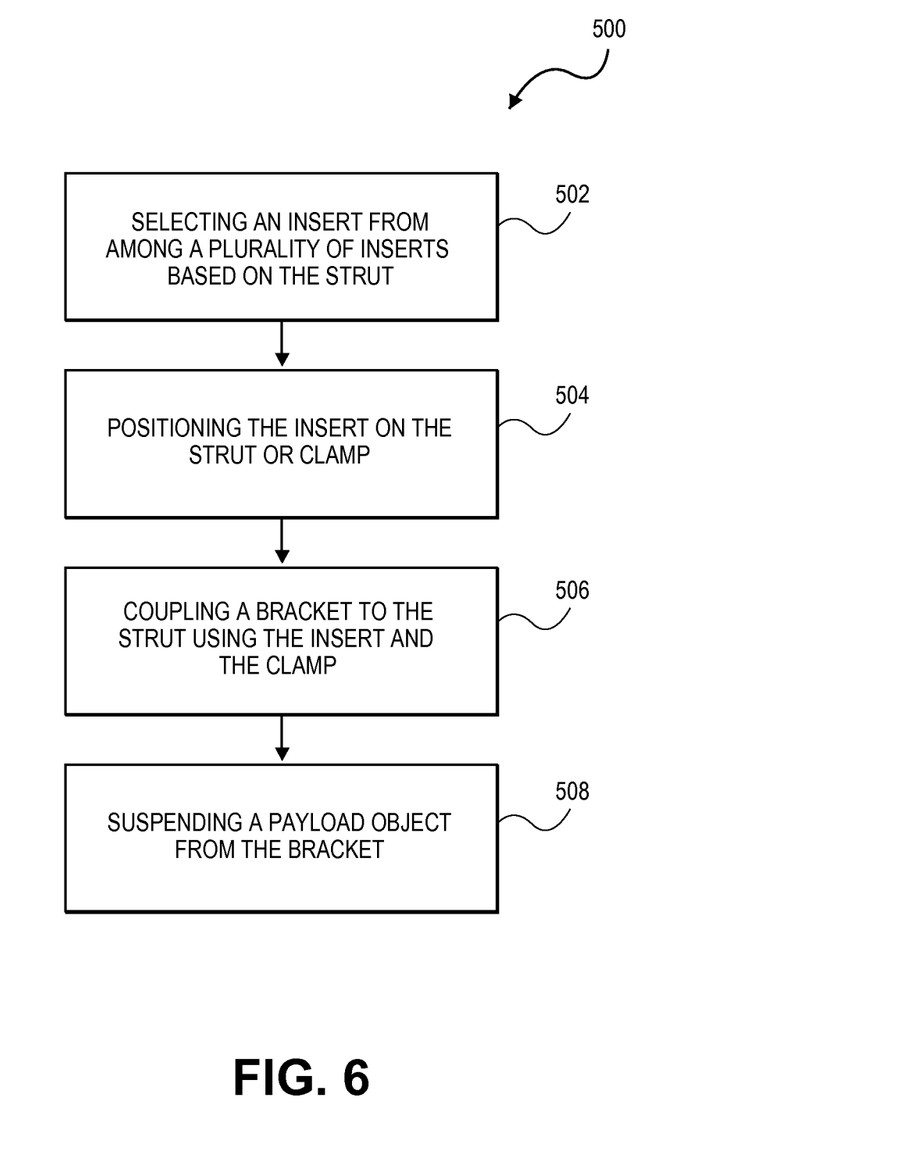
FIG. 6 illustrates a flowchart of a method for mounting an object to a strut of an aircraft, according to an embodiment.

The method 500 may begin by selecting the insert 210 from a plurality of inserts based on a size (e.g., one or more dimensions L, H) of the strut 104 to which the object is to be mounted, as at 502. The insert 210 may be chosen, for example, to bridge a gap that may be defined between strut 104 and the clamp 110 of the mount 100. The provision of a plurality of inserts may promote modularity and universality of the mount 100 across a variety of aircraft models, for example.

The method 500 may also include positioning the insert 210 on the strut 104 or the clamp 110, as at 504. For example, the insert 210 may be positioned at a location on the strut 104 that is predetermined for receiving wiring for the object 102. In another embodiment, the insert 210 may be received and, for example, secured inside the clamp 110, so as to form, functionally, a single unit with the clamp 110 and the insert 210. The method 500 may also include coupling the bracket 113 to the strut 104 using the insert 210, as at 506 Such clamping at 506 may proceed by separating at least two arcuate portions 200, 202 of a hinged clamp 110, and receiving the strut 104 and the insert 210 into the hinged clamp 110 between the at least two arcuate portions 200, 202. In another embodiment, with the insert 210 received into the clamp 110 before placing the clamp 110 on the strut 104, the combination of the clamp 110 and the insert 210 may be opened to receive the strut 104 therein, thereby securing the clamp 110 to the strut 104 via the insert 210.

Before, during, or after selection of the insert 210 at 502, the positioning of the insert 504, and/or the coupling of the bracket 113 at 506, the method 500 may include suspending the object 102 from the bracket 113, as at 508. Such suspending at 508 may proceed by fastening the object 102 to a second plate 138 of the bracket 113, as described above. Further, in an embodiment, the coupling at 508 may include substantially isolating vibration from the strut 104 from the object 102.

In a specific example, the coupling at 508 may be achieved by coupling the object 102 to the second arms 128 of the bracket 113, e.g., via the second plate 138 thereof. The second arms 128 may be coupled to the first arms 118 of the bracket 113, and, in turn, the first arms 118 may be coupled to the clamp 110, e.g., via the first plate 116. Moreover, the coupling at 508 may also include positioning dampers 140, which may be dashpot dampers, between the first and second arms 118, 128, so as to effect the aforementioned vibration isolation.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An apparatus for mounting an object, comprising:
a clamp configured to attach to a strut;
a bracket coupled to the clamp, wherein the bracket comprises:
a first arm comprising a first end disposed proximal to the clamp, a second end disposed distal to the clamp, a first connection section coupled to a first plate, and a second connection section extending parallel to the first connection section, wherein the first arm extends from the first connection section at an angle;
a second arm comprising a first end disposed proximal to the clamp and coupled to the object, and a second end coupled to the second end of the first arm, wherein the second arm is positioned between the first arm and the object, wherein the first end of the second arm includes a third connection section that is coupled with a second plate, the second plate is coupled to the object, and the second end of the second arm includes a fourth connection section that is oriented parallel to the second connection section, wherein the second arm extends from the third connection section at an angle such that the first and second arms are substantially parallel;
a third arm comprising a first end disposed proximal to the clamp, a second end disposed distal to the clamp, a fifth connection section coupled to the first plate, and a sixth connection section extending parallel to the fifth connection section, wherein the third arm extends from the fifth connection section at an angle; and
a fourth arm comprising a first end disposed proximal to the clamp and coupled to the object, and a second end coupled to the second end of the third arm, wherein the first end of the fourth arm includes a seventh connection section that is coupled with the second plate, the second plate coupled to the object, and wherein the second end of the fourth arm includes an eighth connection section that is oriented parallel to the sixth connection section that is oriented parallel to the third connection section, wherein the fourth arm extends from the seventh connection at an angle such that the third and fourth arms are substantially parallel;
a first damper coupled to the second connection section of the first arm and the fourth connection section at the second end of the second arm, such that the first damper connects together the first and second arms; and
a second damper coupled to the sixth connection section at the second end of the third arm and the eighth connection section at the second end of the fourth arm, such that the second damper connects together the third and fourth arms.

2. The apparatus of claim 1, wherein the clamp is further configured to attach to the strut without modification to the strut.

3. The apparatus of claim 2, further comprising an insert selected from a plurality of inserts based on a dimension of the strut.

4. The apparatus of claim 2, wherein the clamp further comprises a first arcuate portion, a second arcuate portion, and a hinge connecting the first and second arcuate portions, such that the first and second arcuate portions are configured to angularly separate to receive the strut.

5. The apparatus of claim 1, wherein the strut is a wing strut extending between a fuselage and a wing of an aircraft.

6. The apparatus of claim 1, wherein the object is a camera.

7. The apparatus of claim 1, further comprising an aerodynamic cover coupled to the bracket and configured to cover at least a portion of the bracket and at least a portion of the object.

8. The apparatus of claim 1, wherein the bracket is fixed from rotation relative to the strut while allowing at least a portion of the object to rotate relative to the strut.

* * * * *